Oct. 9, 1934.  B. THOMSON  1,976,309
SELF LOCKING GEAR SHIFTING DEVICE
Filed March 3, 1932
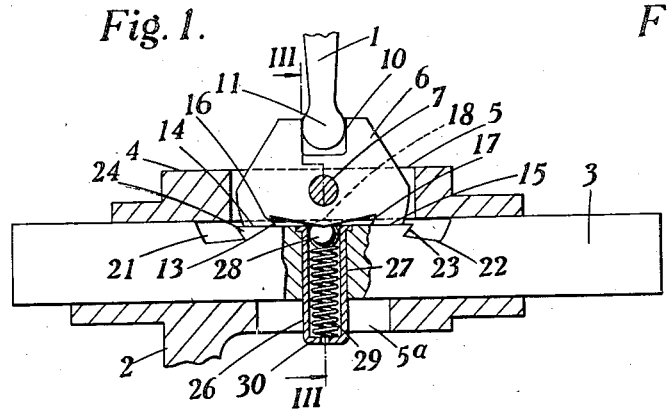
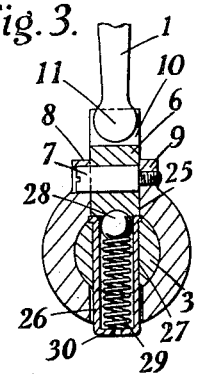
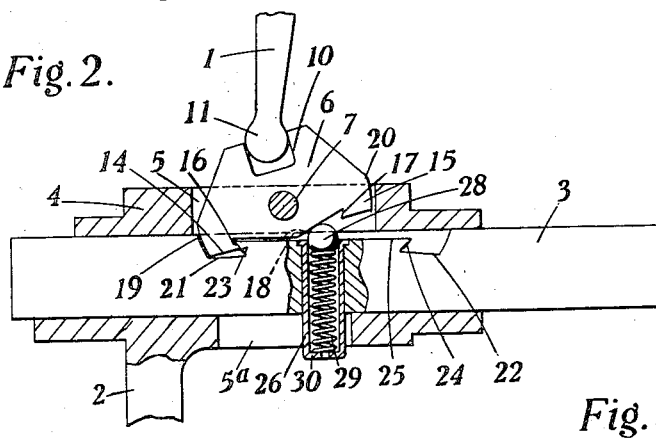
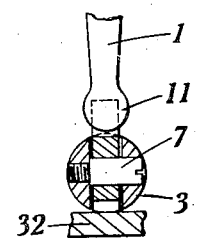
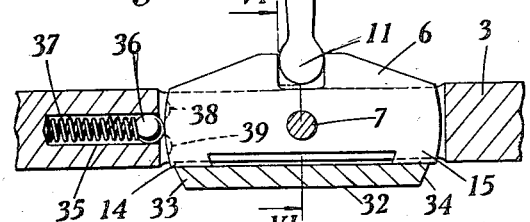
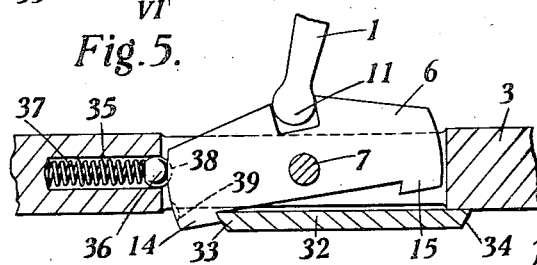
INVENTOR
Bernard Thomson
BY
Blackmore, Spencer & Fiech
ATTORNEYS Patented Oct. 9, 1934

1,976,309

UNITED STATES PATENT OFFICE 1,976,309

SELF-LOCKING GEAR SHIFTING DEVICE

Bernard Thomson, Combe Close, Woldingham, England, assignor to General Motors Corporation, Detroit, Mich., a corporation of Delaware Application March 3, 1932, Serial No. 596,461
In Great Britain March 21, 1931

8 Claims. (Cl. 74—475)

My invention relates to control mechanism, and is especially applicable to gear boxes.

My invention has for its object to provide an improved arrangement of control mechanism, in which arrangement accidental displacement of the mechanism from the position in which it has been set by the operating lever or member, is effectively prevented.

My invention consists in a control arrangement for mechanism adapted to be set in two or more positions, in which arrangement, on operation of the control lever or member to position the mechanism, the mechanism is automatically locked on attaining the set position.

My invention further consists in the improved control mechanism for gear boxes, to be hereinafter described.

Referring now to the accompanying drawing in which similar parts, where desirable, are indicated by the same reference numerals, Figure 1 shows a sectional elevation of control mechanism constructed according to my invention, for the gear box of a motor vehicle, the parts being shown in the neutral position.

Figure 2 shows a similar view with the parts locked in an operative position.

Figure 3 shows a cross-section through the line III—III, on Figure 1.

Figure 4 shows a sectional elevation of a modification, the parts being represented in the neutral position.

Figure 5 shows a similar view to that illustrated in Figure 4, the parts being locked in an operative position.

Figure 6 shows a section through the line VI—VI, on Figure 5.

In carrying my invention into effect, according to one form and as applied by way of example to the gear box of a motor vehicle, in which gear box the changes for the different speeds are effected by a ball-mounted control lever, I arrange the striking forks for positioning the gear wheels for the various speeds, to slide on separate guide rods which are fixed in the gear box casing. In Figures 1, 2 and 3, only the lower portion of the control lever, 1, a single striking fork, 2, and a single guide rod, 3, are shown.

The boss, 4, of the striking fork, 2, is formed with two diametrically opposite openings, 5 and 5a, which are of rectangular section, and in the upper opening, 5, a locking member, 6, is arranged. The locking member, 6, is pivotably mounted on a screwed pin, 7, extending between the side walls, 8 and 9, of the opening, 5, so that the locking member, 6, may swing on an axis at right angles to the axis of the guide rod, 3. The upper portion of the locking member, 6, projects beyond the opening, 5, and is formed with a notch, 10, with which the spherical end, 11, on the lower end of the lever, 1, is adapted to engage.

The lower face, 13, of the locking member, 6, is provided with teeth, 14 and 15, the operative faces, 16 and 17, of which form arcs of circles struck from the centre of the pin, 7, while a hemi-spherical recess, 18, is formed centrally on the face, 13. The faces, 19 and 20, of the locking member form parts of circles struck from the centre of the pin, 7.

On the guide rod, 3, two notches, 21 and 22, are formed, the operative faces, 23 and 24, of these notches being arranged to correspond to the faces, 16 and 17, on the teeth, 14 and 15, respectively of the locking member, 6. Between the notches, 21 and 22, the face, 25, of the guide rod, 3, is flat, as shown in Figure 3, and a casing, 26, is rigidly secured in a hole, 27, the upper end of which opens on the face, 25. In the casing, 26, a ball, 28, is slidably mounted and is acted on in the upward direction by a spring, 29. One end of the spring, 29, abuts against the ball, 28, while the other end abuts against the face, 30, of the casing, 26. The lower end of the casing, 26, projects through the opening, 5a, in the boss, 4, of the striking fork, 2.

In the central position of the striking fork, 2, Figure 1, corresponding to the neutral position of the gear, the locking member, 6, is prevented from tilting by the teeth, 14 and 15, which bear on the face, 25, of the guide rod, 3, while the locking member, and consequently the striking fork, are locked in position by the engagement of the ball, 28, with the recess, 18.

If the gear lever, 1, is in the neutral position, as shown in Figure 1, and it is desired to move the striking fork, 2, into the position shown in Figure 2, the control lever, 1, is operated so that its end, 11, is swung to the left of the position in the former figure, whereby the fork, 2, with the locking member, 6, is also moved to the left, the ball, 28, being automatically disengaged from the recess, 18, by the movement of the control lever. When the tooth, 14, registers with the notch, 21, the forces exerted by the control lever and by the spring-actuated ball, 28, which now acts at the end of an arm about the axis of the locking member, 6, swing this member in an anti-clockwise direction about its pin, 7, so that the tooth, 14, is forced into engagement with the notch, 21. The striking fork, 2, and also the gear lever, 1, are locked in the position in which they have been set, as shown in Figure 2, and this position corresponds to that of one of the speed positions of the gear wheels in the gear box. The spring-actuated ball, 28, prevents the locking member, 6, becoming accidentally disengaged by vibration or shocks.

If it is desired to return the mechanism to the neutral position, shown in Figure 1, the gear lever, 1, is moved in the opposite direction to that above described. The initial movement of the control lever, 1, causes the end, 11, to swing the locking member in the clockwise direction against the action of the spring-actuated ball, 28, and to disengage the tooth, 14, from the notch, 21. The striking fork, 2, may then be returned to the neutral position when the ball, 28, engages again with the recess, 18, or the striking fork, 2, may be moved past the neutral position towards the right and into a position in which the tooth, 15, engages with the notch, 22. The latter position corresponds to another of the speed positions of the gear wheels in the gear box.

For a three-speed and reverse gear, two such mechanisms as above described are arranged side by side in the gear box, the notches of the locking members in the neutral position being in alignment with one another so that the gear lever may be swung so as to engage with either of the locking members and thereafter swung in either of the directions above described to effect the desired gear change.

In Figures 4 to 6, I have illustrated a modified form of mechanism in which the striking forks are secured to guide rods which are slidably mounted in the gear box casing but are incapable of rotating.

In these figures, the locking member, 6, is arranged in a slot, 31, in the guide rod, 3, and is pivotally mounted on the pin, 7, which is screwed into the guide rod. The guide rod, 3, slides over a bar, 32, which is fixed in the gear box casing. The edges, 33 and 34, of the bar, 32, are bevelled as shown.

In the guide rod, 3, an axially arranged hole, 35, houses a spring-actuated ball, 36, the ball being acted on by the spring, 37, so that the ball is continually pressed towards the right. The ball, 36, is adapted to co-act with recesses, 38 and 39, so as to hold the locking member, 6, in either of its tilted positions. A second spring-mounted ball, not shown, of the usual type is provided for retaining the guide rod, 3, and hence the locking member, 6, in the neutral position shown in Figure 4.

On moving the end, 11, of the control lever, 1, to the left of the neutral position shown in Figure 4, the locking member, 6, together with the guide rod, 3, are moved also to the left until the tooth, 14, engages with the edge, 33, of the bar, 32, as shown in Figure 5, when the spring-actuated ball, 36, engages with the recess, 38, and locks the parts in position. In the above movement, the striking fork, not shown, which is secured to the guide rod, 3, has positioned the gear wheels for one of the speeds.

On moving the control lever, 1, in the reverse direction, the locking member, 6, on the initial movement, is swung in the clockwise direction, Figure 5, on the pin, 7, disengaging the spring-actuated ball, 36, from the recess, 38, and the tooth, 14, from the edge, 33, of the bar, 32, when the locking member together with the guide rod, 3, and its striking fork, may be moved back to the neutral position as shown in Figure 4, or to the left of this position so that the tooth, 15, may engage with the edge, 34, of the bar, 32, when the spring-actuated ball, 36, engages with the recess, 39, and locks the parts in position. In the latter position, the striking fork and gear wheels in the gear box are in another of the speed positions.

By means of my invention, it will be seen that accidental displacement of the gear mechanism from the engaged position is effectively prevented and the operation of the gear lever automatically unlocks and locks the control mechanism.

My invention may be applied to gear boxes having other numbers of speeds than that above described and also to gear boxes with gear change. My invention may also be applied to control mechanism other than gear boxes.

Modifications may be made in the examples of my invention above described.

I claim:—

1. In a change speed transmission, a fork movable to spaced active positions corresponding to predetermined driving ratios, a locking member mounted on said fork for pivotal movement relative thereto, a lever movably connected to said locking member and mechanism associated with said locking member whereby it is restrained from its relative movement and said fork is moved by said lever for positions of said fork between its active positions and whereby said locking member is given its relative movement by said lever into locking position in said active positions of said fork.

2. In a change speed transmission, a slidable fork movable to spaced active positions corresponding to predetermined driving ratios, a locking member pivoted thereto, a lever movably connected to said locking member and mechanism associated with said locking member whereby it is restrained from its pivotal movement and said fork is moved by said lever for positions of said fork between its active positions, and whereby said locking member is given a pivotal movement by said lever into locking position in said active positions of said fork.

3. The invention defined by claim 1 together with yieldable means engageable with the locking member operable to hold it in its locking positions.

4. The invention defined by claim 1, said mechanism comprising a fixed member having a surface in sliding engagement with a face of said locking member when out of locking position.

5. The invention defined by claim 8, the provision for locking comprising a fixed member, said locking member and fixed member having cooperating lugs and notches having walls shaped to resist release by end thrust from the shifting member.

6. The invention defined by claim 8, the provision for locking comprising a fixed member, said locking member and fixed member having cooperating lugs and notches having walls shaped to resist release by end thrust from the shifting member, and yielding means to hold said locking means in locked position subject to release by action of said means.

7. In a change speed transmission, a slidable change speed shifting member, a fixed member, a lock device pivoted to the slidable member, an operating member engaged with said lock device to first move it bodily together with said shifting member and than to rock it relatively to the slidable member into locking engagement with said fixed member.

8. In a change speed transmission, a fixed member, a shift fork, a lever to move said fork to its active positions of adjustment, a lock device moved by said lever together with said fork between active positions of the latter and said locking device comprising means between said fixed member and said lock for interengagement, and means whereby the lock is positively moved by said lever relative to said fork into locking position for the active positions of the fork.

BERNARD THOMSON.